Jan. 15, 1963   F. A. DELLI-GATTI, JR   3,073,582
CUTTER BIT AND HOLDER
Filed March 31, 1958
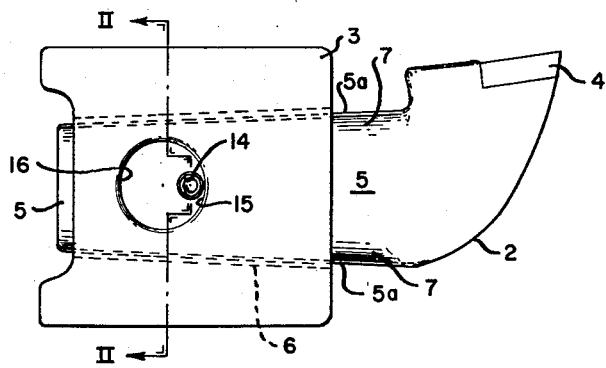
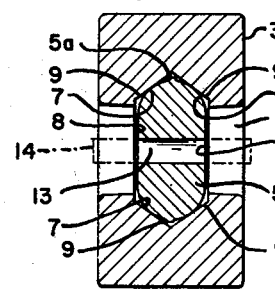
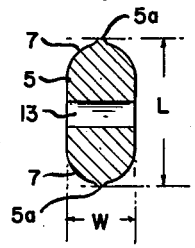
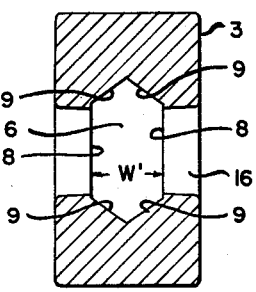
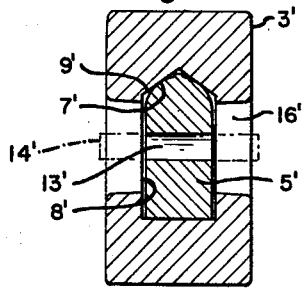
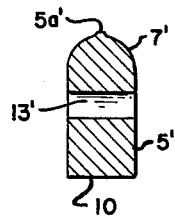
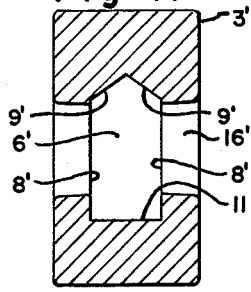
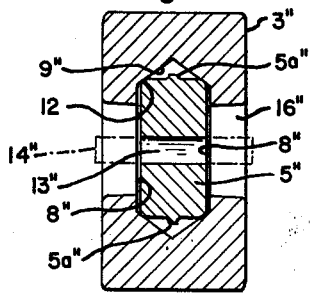
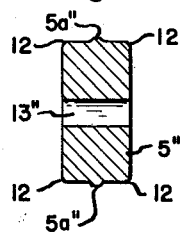
INVENTOR
Frank A. Delli-Gatti, Jr.

United States Patent Office 3,073,582
Patented Jan. 15, 1963

3,073,582
CUTTER BIT AND HOLDER
Frank A. Delli-Gatti, Jr., Bridgeport, W. Va., assignor to Charles E. Compton, Bridgeport, W. Va.
Filed Mar. 31, 1958, Ser. No. 725,180
10 Claims. (Cl. 262—33)

This invention relates to a cutter bit and holder. It has to do with a novel form of cutter bit and holder whereby a cutter bit is held against tilting in the socket of the bit holder.

It has been customary to machine the shanks of cutter bits and the sockets of bit holders to insure a fit between the shank and socket to prevent the bit from tilting in the holder. Not only has the machining greatly added to the cost of the bits and holders but when a bit holder is welded to the machine part which is to carry the bit the heat incident to the welding causes distortion of the holder and destroys the fit between the bit shank and the holder socket.

I provide a cutter bit and holder eliminating the necessity of machining the bit and holder yet insuring firm holding of the bit against tilting even though the holder has become distorted due to its being welded to the machine part which is to carry the bit. I provide a cutter bit having a non-circular tapered shank and a holder having a tapered socket for receiving the tapered shank, the shank and socket being shaped so that when the shank is inserted into the socket it engages the socket at three places spaced apart peripherally of the shank and is spaced from the socket in between such places whereby the shank is braced against tilting in the socket in any direction. Preferably my cutter bit has a tapered shank which in transverse cross section ("transverse cross section" means cross section transversely of the length of the shank) is longer than it is wide (the length is the maximum dimension and the width is the minimum dimension of the transverse cross section) and having at least one transversely rounded surface portion at a transverse end thereof (a transverse end is a terminus of the maximum dimension of the transverse cross section) and my holder has a tapered socket for receiving the tapered shank, the socket being in transverse cross section longer than it is wide and being materially wider than the shank and shaped so that when the shank is inserted into the socket the shank engages the socket at three places two of which are at said transverse end of the shank and the other of which is at the opposite transverse end, such engagement maintaining the sides of the shank out of contact with the sides of the socket, whereby the shank is braced against tilting in the socket in any direction.

The cutter bit shank is preferably transversely rounded at at least the corner portions at a transverse end thereof, and the socket at a transverse end thereof is preferably concavely formed by a plurality of generally planar faces against which rounded surface portions of the shank are adapted to lie when the shank is inserted into the socket. The bit shank and the holder may be forged or cast and need not be machined. The bit shank may have flash at the transverse end thereof which may be received in the concavity formed by the plurality of generally planar faces of the socket.

Preferably the bit shank is transversely rounded at at least the corner portions at each transverse end thereof and the holder has a tapered socket for receiving the tapered shank, the socket being in transverse cross section longer than it is wide and being materially wider than the shank, the socket at each transverse end thereof being concavely formed by a plurality of generally planar faces against which rounded surface portions of the shank are adapted to lie when the shank is inserted into the socket, whereby the shank engages the socket at at least three places two of which are at said faces at one transverse end of the socket and at least one other of which is at one of said faces at the opposite transverse end of the socket, such engagement maintaining the sides of the shank out of contact with the sides of the socket, whereby the shank is braced against tilting in the socket in any direction. An entire transverse end of the shank may be transversely rounded, and in the preferred form of my cutter bit both transverse ends of the shank are continuously transversely rounded. The socket in its preferred form is concavely formed at each transverse end thereof by two intersecting generally planar faces against which rounded surface portions of the shank are adapted to lie when the shank is inserted into the socket.

I further provide a cutter bit having a shank and a holder having a socket for receiving the shank of the cutter bit, the cutter bit and holder having means limiting the extent of insertion of the shank of the cutter bit into the socket, the shank having a hole therethrough, and a friction pin extending through the hole in the shank and having its projecting portions disposed behind shoulder portions of the holder to prevent undesired separation of the cutter bit and holder. Desirably the shank and socket are tapered, the tapered form thereof limiting the extent of insertion of the shank of the cutter bit into the socket.

Other details, objects and advantages of the invention will become apparent as the following description of certain present preferred embodiments thereof proceeds.

In the accompanying drawings I have shown certain present preferred embodiments of the invention in which FIGURE 1 is a face view of a cutter bit and holder;

FIGURE 2 is a transverse cross-sectional view taken on the line II—II of FIGURE 1;

FIGURE 3 is a transverse cross-sectional view taken on the line II—II of FIGURE 1 of the shank only;

FIGURE 4 is a transverse cross-sectional view taken on the line II—II of FIGURE 1 of the bit holder only;

FIGURES 5, 6 and 7 are views corresponding respectively to FIGURES 2, 3 and 4 of a different form of shank and holder;

FIGURE 8 is a view similar to FIGURE 2 showing the same holder but with a different form of bit shank; and FIGURE 9 is a cross-sectional view of the bit shank shown in FIGURE 8.

Referring now more particularly to the drawings, there are shown in FIGURES 1–4 a cutter bit designated generally by reference numeral 2 and a bit holder or block designated generally by reference numeral 3. The cutter bit 2 has a cutting head 4 which may be of any appropriate shape and a tapered shank 5. The holder 3 has a tapered socket 6 having substantially the same taper as the bit shank 5 and adapted to receive the bit shank when the bit is to be held by the holder.

As will be understood from what is stated above, my improvement has to do with the shape of the bit shank and the shape of the socket in the bit holder. The bit shank is tapered and non-circular in cross section. Preferably in transverse cross section the bit shank is longer than it is wide. In FIGURE 3 the length in transverse cross section of the bit shank 5 is designated by the dimension L. In the form shown the bit shank 5 has at each transverse end flash designated by reference numeral 5a. As will presently appear, it is not necessary to machine the bit shank or even grind off the flash. The transverse ends of the bit shank 5 are continuously rounded as shown at 7. In the form shown the transverse ends of the bit shank are rounded substantially semi-circularly but it is not essential that circle arcs be employed. The sides of the bit shank 5 are generally planar, the transverse width of the shank being designated by the dimension W. The dimension W may be a substantially constant dimension throughout the area of the shank while the dimension L of course varies along the shank.

The socket 6 of the holder 3 has generally parallel side faces 8 and the transverse ends of the socket are formed by a plurality of generally planar faces. In the form shown there are two generally planar faces designated by reference numeral 9 which provide the socket with a generally concave or V-shaped transverse end portion at each transverse end of the socket. The width of the socket is designated by the dimension W'. The shank and socket are relatively dimensioned so that the shank width W is materially less than the socket width W'. When the bit shank is inserted into the socket the shank engages the socket at at least three places, to wit, three of the four places where the rounded surface portions 7 of the shank are disposed in opposed relation to the generally planar faces 9 of the socket. Two of such places will be at one transverse end of the bit shank and the third will be at the opposite transverse end. Such engagement between the bit shank and socket maintains the sides of the shank out of contact with the sides of the socket and by reason of the engagement between the shank and the socket at three places of very limited area the shank is in effect wedged into the socket and braced against tilting in the socket in any direction, such engagement maintaining the sides of the shank out of contact with the sides of the socket. The bit is braced against tilting relatively to the holder regardless of whether the holder may have become distorted due to the heat of welding when being welded to the machine part to which the bit is to be applied and without the necessity of machining either the bit shank or the holder socket or even grinding the flash off of the bit shank. As shown in FIGURE 2, a space is provided at the apex of the angle between the two faces 9 at each transverse end of the socket wherein the flash 5a is received.

FIGURES 5, 6 and 7 show a modified form of shank ever, in FIGURES 5, 6 and 7 the downward ends of the shank and socket are identical with the upward ends of the shank and socket in FIGURES 2, 3 and 4. However, in FIGURES 5, 6 and 7 the downward ends of the bit shank and socket are generally planar as shown at 10 and 11 respectively, the bit and holder otherwise being the same as in FIGURES 1–4. When the bit shank of FIGURES 5, 6 and 7 is inserted into the socket of those figures there will be contact between the generally planar face 10 of the bit shank and the generally planar face 11 of the socket and also between the opposite rounded transverse end of the bit shank, designated 7' in FIGURES 5 and 6, and the generally planar faces 9' of the socket designated in FIGURES 5 and 7. Here again the shank is held in place in the socket by a three point wedging action which maintains the sides of the shank out of contact with the sides of the socket and braces the shank against tilting in the socket in any direction.

The solder shown in FIGURE 8 is the same as that of FIGURES 2 and 4. The bit shank shown in FIGURES 8 and 9 differs from that shown in FIGURES 2, 3 and 4 only in that the transverse corners only of the shank are rounded as shown at 12 instead of the transverse ends of the shank being continuously rounded as shown at 7 in FIGURES 2 and 3. However, the result is the same as two of the rounded corner portions 12 at one end of the shank engage two of the generally planar faces 9 of the socket and one rounded corner at the opposite transverse end of the shank engages one of the generally planar faces 9 at such end, bracing the shank against tilting in the socket in any direction and maintaining the sides of the shank out of contact with the sides of the socket. Flash 5a' is shown at the upward end of the bit shank in FIGURES 5 and 6 and flash 5a'' is shown at both transverse ends of the bit shank in FIGURES 8 and 9. The flash is in each case received in the concavity formed by the generally planar faces of the socket.

It is possible for the bit shanks and sockets of FIGURES 2 and 8 to have engagement at all four faces 9 but that would be unusual since as soon as the bit shank engages three of the faces it is wedged tight and cannot move farther into the socket or tilt in the socket in any direction.

The bit shank has a hole 13 therethrough and a friction pin 14 is shown in FIGURE 1 extending through the hole 13 and having its projecting portions disposed behind shoulder portions 15 of the holder to prevent undesired separation of the cutter bit and holder. The shoulder portions 15 at opposite sides of the holder may be provided by drilling a relatively large hole 16 through the holder. The friction pin may be a roll pin made by rolling sheet metal upon itself so that when the pin is inserted into the hole 13 it stays in position due to the frictional contact between the pin and the surrounding surface of the bit shank defining the hole. If the bit shank should tend to become loose in the holder the projecting portions of the pin 14 will engage the shoulder portions 15 and thus prevent undesired separation of the bit and the holder.

Thus my bit and holder have important advantages despite the fact that machining is not required and distortion of the holder due to the heat of welding when the holder is welded to the machine part to which the bit is to be applied does not adversely affect the holding of the bit or the bracing of it against tilting in the socket.

While I have shown and described certain present preferred embodiments of the invention it is to be distinctly understood that the invention is not limited thereto but may be otherwise variously embodied within the scope of the following claims.

I claim:

1. A cutter bit having a tapered shank which in transverse cross section is longer than it is wide and having at lease one transversely rounded surface portion at a transverse end thereof, and a holder having a tapered socket whose taper is substantially the same as the taper of the shank which in transverse cross section is longer than it is wide and is materially wider than said shank of the cutter bit, said shank is disposed in contact with the socket at three places two of which are at said transverse end of said shank and the other of which is at the opposite transverse end, said socket having planar surfaces engaged by said rounded surface portion and with said sides of the shank out of contact with the sides of said socket, whereby the shank is braced against tilting in the socket in any direction.

2. A cutter bit having a tapered shank which in transverse cross section is longer than it is wide and transversely rounded at at least the corner portions at a transverse end thereof, and a holder having a tapered socket whose taper is substantially the same as the taper of the shank which in transverse cross section is longer than it is wide and is materially wider than the shank and which at a transverse end thereof is concavely formed by a plurality of generally planar faces in which the tapered shank of the cutter bit is disposed with rounded surface portions of the shank in contact with said generally planar faces, the shank engaging the socket at three places two of which are at said faces and the other of which is at the opposite transverse end of the shank with the sides of the shank out of contact with the sides of the socket, whereby the shank is braced against tilting in the socket in any direction.

3. A cutter bit having a tapered shank which in transverse cross section is longer than it is wide and transversely rounded at at least the corner portions at a transverse end thereof, the shank having flash at said transverse end thereof, and a holder having a tapered socket whose taper is substantially the same as the taper of the shank which in transverse cross section is longer than it is wide and is materially wider than the shank and which at a transverse end thereof is concavely formed by a plurality of generally planar faces in which the tapered shank of the cutter bit is disposed with rounded surface portions of the shank in contact with said generally planar faces and with the flash on the shank received in the concavity formed by said faces, the shank engaging the socket at three places two of which are at said faces and the other of which is at the opposite transverse end of the shank with the sides of the shank out of contact with the sides of the socket, whereby the shank is braced against tilting in the socket in any direction.

4. A cutter bit having a tapered shank which in transverse cross section is longer than it is wide and transversely rounded at at least the corner portions at a transverse end thereof, and a holder having a tapered socket whose taper is substantially the same as the taper of the shank which in transverse cross section is longer than it is wide and is materially wider than the shank and which at a transverse end thereof is concavely formed by two intersecting generally planar faces in which the tapered shank of the cutter bit is disposed with said rounded surface portions of said shank in contact with said generally planar faces, said shank engaging said socket at three places two of which are at said faces and the other of which is at the opposite transverse end of said shank with the sides of said shank out of contact with the sides of said socket, whereby said shank is braced against tilting in said socket in any direction.

5. A cutter bit having a forward cutting portion and a shank with parallel sides and convex top and bottom surfaces, said top and bottom surfaces taper rearwardly from said forward cutting portion, a holder having a socket for receiving said shank, and said socket having oppositely disposed V-shaped top and bottom surfaces for complementary engagement by said convex surfaces.

6. A cutter bit having a forward cutting portion and a shank with parallel sides and convex top and bottom surfaces, said top and bottom surfaces taper rearwardly from said forward cutting portion, a holder having a socket for receiving said shank, and said socket having parallel sides whose dimension from side to side is greater than the similar dimension between said parallel sides of said shank, and said socket having V-shaped top and bottom surfaces that taper rearwardly for complementary engagement by said convex surfaces.

7. A cutter bit having a forward cutting portion and a shank with parallel sides and convex top and bottom surfaces, said top and bottom surfaces taper rearwardly from said forward cutting portion, and a holder having a socket for receiving said shank, said socket having V-shaped top and bottom surfaces for complementary engagement by said convex surfaces and said V-shaped top and bottom surfaces taper rearwardly to the same degree as said convex top and bottom surfaces.

8. A cutting tool comprising a holder having socket therein; said socket having a plurality of non-coplanar surfaces wherein the intersections thereof define parallel lines; each of said surfaces is a planar surface; a cutter bit having a forward portion and a shank portion; said shank portion being received by said socket; said shank portion having a pair of oppositely disposed rounded sides for engagement by portions of said surfaces; said rounded surfaces taper rearwardly; and said surfaces that are engaged by said rounded surfaces taper rearwardly.

9. A cutting tool comprising a holder having a socket therein; said socket having a pair of oppositely disposed parallel sidewalls and a pair of oppositely disposed V-shaped top and bottom rearwardly tapering surfaces; a cutter bit having a forward portion and a shank portion wherein said shank portion is held by said socket; said shank having a pair of parallel sides, and a pair of convex sides; said pair of convex sides taper rearwardly from said forward portion; and said cutter bit is securely held by said holder only by the engagement between said convex sides of said shank portion and said V-shaped surfaces of said socket.

10. A cutting tool comprising a holder having a socket extending inwardly from the front portion thereof; said socket being hexagonal in cross section; said socket having a pair of oppositely disposed parallel sidewalls and two pairs of planar intersecting surfaces wherein said pairs of planar surfaces are oppositely disposed; the respective said pairs of intersecting planar surfaces converge toward each other to define a tapering socket; a cutter bit having a forward portion and a shank portion wherein said shank portion is received in said socket; said shank portion having a pair of oppositely disposed convex sides that taper rearwardly from said forward portion, and said convex sides engage said planar surfaces to hold said bit to said holder.

References Cited in the file of this patent
UNITED STATES PATENTS

| | | |
|---|---|---|
| 688,945 | De Grave | Dec. 17, 1901 |
| 1,050,702 | Shouldice | Jan. 14, 1913 |
| 1,262,870 | Thomson | Apr. 16, 1918 |
| 1,387,339 | Banister | Aug. 9, 1921 |
| 1,685,196 | Gilbert | Sept. 25, 1928 |
| 2,353,685 | Askue | July 18, 1944 |
| 2,397,521 | Askue | Apr. 2, 1946 |
| 2,648,247 | Schmuziger | Aug. 11, 1953 |
| 2,737,843 | Koehl | Mar. 13, 1956 |
| 2,907,559 | Brown et al. | Oct. 6, 1959 |

FOREIGN PATENTS

| | | |
|---|---|---|
| 73,476 | Denmark | Dec. 3, 1951 |
| 734,713 | Germany | Apr. 22, 1943 |
| 928,883 | Germany | June 13, 1955 |

OTHER REFERENCES

Rollpin advertisement, 2 pgs. received in Patent Office December 15, 1952.